3,019,265
PROCESS FOR PREPARING IRONES
Habib Emile Eschinazi, now by judicial change of name, Emile Haviv Eschinasi, Montclair, N.J., assignor to The Givaudan Corporation, New York, N.Y., a corporation of New Jersey
No Drawing. Filed Apr. 2, 1959, Ser. No. 803,596
2 Claims. (Cl. 260—587)

This invention relates to a novel synthesis for irones (6-methyl ionones).

Ever since irone was isolated from orris root by Tiemann and Krüger in 1893, various synthetic attempts were made to make this valuable chemical accessible to the aromatic industry. The earlier attempts of Ruzicka and co-workers in 1933 for the elucidation of the structure of irone were followed in 1940 by their attempted synthesis of 6-methylionones later identified with the irones. A practical synthesis of 3-methylcitrals and 3-methyl-3-linalool which afforded the synthesis of irones was then developed about 1947 by various workers. Another approach to the synthesis of irones was later made in 1952 by Grütter, Helg and Schinz using the known thujacetone for the synthesis of the intermediate 3-methylcitrals and their isomers. More recently the total synthesis of 5,6-dimethyl-5-hepten-2-one from methylisopropenylketone, acetylene and diketene led to a marked improvement in the synthesis of irone in about eight successive steps.

The present invention provides a process for making irones from inexpensive α-pinene in only five steps. The over-all yields of irones are comparatively high.

The overall synthesis is set forth in the following accepted abbreviated form:

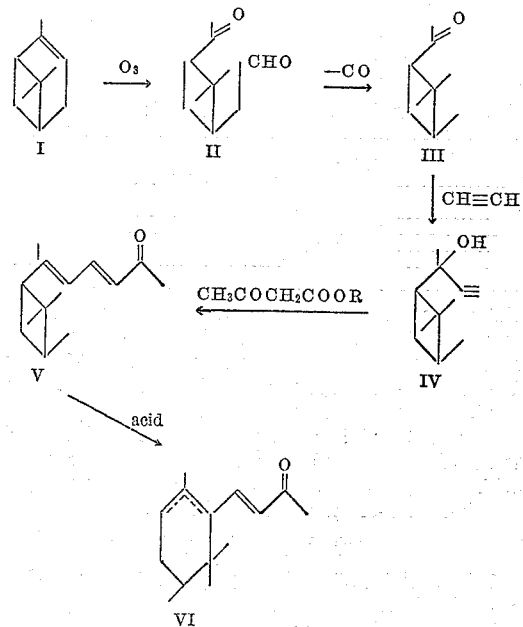

The names of the compounds represented by the Roman numerals in the foregoing sequence are as follows:

I α-pinene
II pinonic aldehyde
III 1-acetyl-2,2,3-trimethylcyclobutane
IV 3-(2,2,3-trimethylcyclobutyl)-but-1-yn-3-ol
V 2-(2,2,3-trimethylcyclobutyl)-hepta-2,4-dien-6-one
VI irone Novel processes and/or novel products involved in the preparation of II, III, IV and V are disclosed and claimed in the following applications filed of even date herewith by the present applicant: Ser. No. 803,593; Ser. No. 803,594; Ser. No. 803,565; Ser. No. 803,595; respectively.

Stated in general terms, the present process involves the ozone treatment of α-pinene in the presence of participating solvents such as water, methanol or acetic acid, heating the resulting product under reducing and hydrolyzing conditions to yield pinonic aldehyde (II); decarbonylating the latter at elevated temperatures (from about 100° C. to 300° C.) in the presence of a suitable catalyst, such as palladium or Raney nickel, to yield pinonone III; treating the latter with acetylene in the presence of a basic catalyst (such as sodium hydroxide, potassium hydroxide, metallic sodium, sodamide, lithium amide, potassium amide, or alkali metal acetylide if desired, in a suitable solvent (such as methylal, diethyl ether or toluene or liquid ammonia) at low temperatures (from about −50° C. to about 0° C.) to obtain 3-(2,2,3-trimethylcyclobutyl)-but-1-yn-3-ol (IV); reacting the latter with a lower alkyl ester of acetoacetic acid or diketene, with or without catalysts or solvents, and heating the reaction mixture at elevated temperatures (such as about 150° C. to about 200° C.) to form 2-(2,2,3-trimethylcyclobutyl)-hepta-2,4-dien-6-one (V); and rearranging the latter in the presence of mineral acids at a temperature from about 0° C. to about 50° C. to form irones (VI).

With respect to the conversion of V to VI, operable rearrangement catalysts are phosphoric acid, sulfuric acid, and in general strong acids that are known to provide protons. This surprising fact is probably due to the necessity to form an intermediate protonated form Va resulting from the opening of the cyclobutane ring and capable of rearrangement Vb by cyclization to the desired six membered ring of the irone VI through loss of the proton thus:

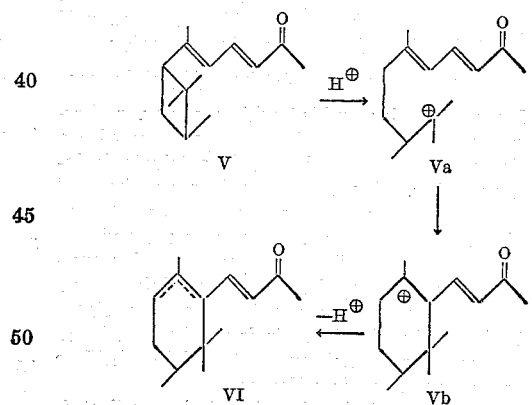

On the other hand, Lewis-acid type catalysts, such as $BF_3$, which are unable to supply a proton, fail to achieve the rearrangement.

It was surprising to find that the aforementioned operable acids gave the desired results as catalysts such as $BF_3$, which is a catalyst which has been suggested for rearrangement reactions involving the formation of irones, is ineffective in the process of this invention.

While the aforementioned operable acids all give desirable results, it is preferred to employ phosphoric acid, since the yields of the β-irone are low and the yields of the more desirable α-irone and α-neoisoirone are high.

The amount of acid catalyst employed may vary from one mol to 10 moles acid per mole V. We prefer to use 2 to 6 moles of acid per mol of V.

In conducting the present process additional agents may be used if desired. Solvents such as saturated or aromatic hydrocarbons such as benzene, toluene, xylene or chlorinated hydrocarbons such as carbon tetrachloride, ethylene dichloride, etc. or organic acids such as acetic acid may be used, but they are not essential to conduct the desired rearrangement to irones.

In general we use these solvents from 0–10 volumes per 1 volume of V but we prefer to use them from 2–6 volumes per volume of V.

The temperature at which the irones are formed may vary. A temperature within the range from about 0° to about 50° C. may be used, a temperature within the range from about 25° C. to about 30° C. being normally preferred.

In order to illustrate the invention the following example is given, but not by way of limitation.

EXAMPLE (a) Preparation of
2,2-dimethyl-3-acetylcyclobutylacetaldehyde 136 g. of α-pinene, 120 ml. methanol and 60 ml. of water were placed in a 500 ml. reaction vessel cooled from the outside with an ice-water bath, while a stream of ozonized oxygen, from a commercial "Welsbach" T23 ozonator and containing approximately 70–75 mg. ozone per liter, was fed at the rate of 100 liters/hour through a glass, porous pipe dipped into the mixture. After about 7 hrs., the ozone started bleeding out with the outgoing gases and the ozonization was stopped. The reaction mixture was then transferred into a 2-liter flask equipped with a stirrer, a reflux condenser and a dropping funnel and containing 500 ml. water, 50 ml. benzene and 65 g. zinc dust. Then 150 g. 62% sulfuric acid was added under agitation within 5–10 minutes. The reaction mixture started to boil vigorously and was kept under agitation for 10 more minutes. After cooling, the layers are separated and the bottom layer extracted twice with 100 ml. benzene. The combined organic layers are now neutralized with soda ash and the solvent evaporated, leaving behind 140 g. of crude pinonic aldehyde showing a purity of approximately 90% by oximation.

Upon distillation in a 1½-ft. column, approximately 10% of a light cut is obtained followed by about 113 g. of pure pinonic aldehyde boiling at 93° at 3 mm., $n_D^{20}$ 1.4610, $\alpha_D$ 40° showing 98.5% purity by oximation.

(b) Preparation of 1-acetyl-2,2,3-trimethylcyclobutane

Into a 3-necked flask provided with a stirrer, a thermometer, a dropping funnel and a short column with a reflux condenser, 35–40 ml. of pinonic aldehyde is introduced; then 0.5 g. of a 5% palladium on charcoal catalyst is added and the mixture heated under stirring to 200–230°. Carbon monoxide starts to be evolved and is measured by passing the liberated gases through a wet-test meter and then discharged into a very efficient hood (toxic CO). As soon as the gas evolution reaches about 2 liters, additional pinonic aldehyde is slowly introduced through the dropping funnel, while the light distillate of pinonone (below 150°) is collected.

The rate of addition of pinonic aldehyde is so adjusted, that it is approximately equal to the amount of distilled pinonone. The reaction temperature is maintained around 210–220°. 400 g. of pinonic aldehyde is thus introduced within 6–7 hrs., while 55 liters of CO are measured. The total amount of distillate reaches 305 g. and a slight vacuum applied towards the end results in an additional 5–10 g. distillate. The residue consists of about 30 g. of dark, heavy liquid from which the catalyst may be recovered.

The pure pinonone boils at 55–57° at 10 mm. pressure, $n_D^{20}$ 1.4440–1.4410. It consists of a mixture of cis and trans isomers. A semicarbazone m.p. 197–8 and a 2.4 dinitrophenyl hydrazone M.P. 201–202° were obtained from the distilled pinonone.

(c) Preparation of
3-(2,2,3-trimethylcyclobutyl)-but-1-yn-3-ol

In a dry one-liter 3-necked flask are added 280 g. methylal and 224 g. powdered KOH. The flask is provided with a gas inlet tube, an efficient stirrer, a dropping funnel and a gas outlet. The mixture is agitated and cooled to −10° while a dry stream of acetylene is bubbled through. For the first 20–30 minutes, the acetylene is practically all absorbed in the reaction mixture as evidenced by the very small amount of gas bleeding from the gas outlet. As soon as the gas discharge increases, 140 g. of pinonone is slowly introduced around −10 to −5° while the acetylene is being continuously fed. The addition of the ketone is made within about 4 hrs. The mixture is agitated for an additional 2 hrs. and the bubbling of acetylene is continued at such a rate that a small bleeding of the gas takes place continuously, while the temperature is maintained at −5° or slightly below. 500 ml. of ice water are now introduced very slowly under cooling and strong agitation, so that the temperature does not rise above +30°. The top layer is separated and the aqueous layer extracted with benzene. The combined organic layers are freed from the solvents and the 3-(2,2,3-trimethylcyclobutyl)-but-1-yn-3-ol is obtained as a mixture of cis-trans isomers boiling at 70–74° at 8 mm., $n_D^{20}$ 1.4622–1.4670, $\alpha_D$ −3° in a yield of approximately 90% based on the reacted pinonone.

Analysis.—Calc'd. for $C_{11}H_{18}O$: C, 79.46; H, 10.91. Found: C, 79.76; H, 11.02.

(d) Preparation of
2-(2,2,3-trimethylcyclobutyl)-hepta-2,4-dien-6-one 332 g. 3-(2,2,3-trimethylcyclobutyl)-but-1-yn-3-ol, 520 g. ethylacetoacetate are heated in a 2-liter flask provided with a stirrer, a short insulated column (1½ ft.) and a distilling head with a reflux condenser connected to a gas wet-test meter.

The reaction mixture is agitated while heat is being applied. When the reaction temperature reaches 160°, carbon dioxide is evolved and alcohol is distilled at the top of the column between 66–72°. After about 5 hrs., the reaction temperature reaches 178–180° and the amount of gas liberated reaches ca. 45 liters and about 80–85 g. ethanol are collected as the distillate, the decarboxylation is practically finished. Vacuum is then applied and the following cuts distilled:

| | B. P.: | | $n_D^{20}$ |
|---|---|---|---|
| 1 | 40 mm. up to 104°=320 g. | | 1.4282 (average) |
| 2 | 3 mm. up to 90°=12 g. | | 1.4750 |
| 3 | 1.5 mm. up to 114°=15 g. | | 1.4950 |
| 4 | 1 mm. up to 110–130°=270 g. | | 1.5210 |
| Res | =40–50 g. | | |

Cut #4 is the main cut and consists of an isomeric mixture of 2-(2,2,3-trimethylcyclobutyl)-hepta-2,4-dien-6-one, from which a semicarbazone, M.P. 204–205°, and a 2,4-dinitrophenyl hydrazone, M.P. 198–199°, was isolated. Cut #1 consists almost entirely of ethylacetoacetate, cuts 2 and 3 contain some unreacted ethynol and some of the desired ketone mixed with dehydroacetic acid. They may be reworked for the recovery of an additional 50–55 g. of the main cut.

(e) Preparation of irones 200 g. of 2-(2,2,3-trimethylcyclobutyl)-hepta-2,4-dien-6-one is dissolved in 1,000 ml. of toluene (or benzene), 0.5 g. hydroquinone is added, then 600 g. 85% phosphoric acid is introduced within 15 minutes while the mixture is strongly agitated and the temperature is kept between 25–30° by means of a water cooling. Stirring is maintained for 72 hours at 25–30°, then the reaction mixture is left to separate for at least ½ hour and the dark bottom layer is drained.

The top layer is now mixed with 500 ml. of water and stirred for about 15 minutes, then the mixture is allowed to separate for ½ hour and the aqueous bottom layer drained off. A second water wash with 500 ml. water is repeated under the same conditions as the first one.

Finally, the top layer is neutralized with 200 ml. 10% NaOH solution under agitation for 15 minutes. The mixture is left to separate for ½ hour and the bottom layer drained and disposed of. The top layer is then given a water wash with 200 ml. of water under agitation for 5 minutes; then after standing 15–20 minutes, the bottom layer is discarded again. The solvent is then steamed off and the residue weighing approximately 170–175 g. is vacuum steam distilled to yield 135–145 g. of a crude irone mixture having a refractive index of $n_D^{20}$ 1.5060–1.5090. The crude irone mixture is redistilled under high vacuum and the main cut of irones distills at 74–81° at 0.3 mm. pressure with an average $n_D^{20}$ 1,5002, $\alpha_D$ —15°. It has a ketone content of 96.5% by oximation and has an average composition of 60–62% α-neoisoirone, 12–14% α-irone, 78% β-irone and about 15% of other isomers. A 4-phenylsemicarbazone, M.P. 175°, was obtained which was identical (no depression in mixed melting point) with that of α-neoisoirone obtained from an authentic sample of irones made from a sample of pseudoirone from Hoffmann-La Roche & Co., Nutley, N.J., by means of phosphoric acid according to the same technique described above.

The foregoing illustrates the practice of this invention, which, however, is not to be limited thereby, but is to be construed and limited solely by the appended claims.

I claim:
1. The process for preparing irones, which comprises reacting 2-(2,2,3-trimethylcyclobutyl)-hepta - 2,4 - dien-6-one in the presence of mineral acid proton-providing catalysts at a temperature within the range from about 0° to about 50° C.
2. The process for making irones, which comprises reacting 2-(2,2,3-trimethylcyclobutyl)-hepta - 2,4 - dien-6-one in the presence of phosphoric acid at a temperature within the range from about 0° to about 50° C.

References Cited in the file of this patent
UNITED STATES PATENTS

| | | |
|---|---|---|
| 2,636,052 | Grutter | Apr. 21, 1953 |
| 2,750,411 | Fisher et al. | June 12, 1956 |

FOREIGN PATENTS

| | | |
|---|---|---|
| 27,371 | Great Britain | 1912 |

OTHER REFERENCES
Migrdichian: Organic Synthesis, vol. I, p. 186 (1957).
Kimel et al.: J. Org. Chem., vol. 23, pages 153–7 (1958).

UNITED STATES PATENT OFFICE
CERTIFICATE OF CORRECTION

Patent No. 3,019,265 January 30, 1962

Habib Emile Eschinazi, now by
judicial change of name, Emile Haviv Eschinasi

It is hereby certified that error appears in the above numbered patent requiring correction and that the said Letters Patent should read as corrected below.

Column 3, line 30, for "150" read -- 160 --; column 5, line 16, for "78%" read -- 7-8% --.

Signed and sealed this 19th day of June 1962.

(SEAL)
Attest:

ERNEST W. SWIDER
Attesting Officer

DAVID L. LADD
Commissioner of Patents